(12) United States Patent
Aota et al.

(10) Patent No.: US 7,867,644 B2
(45) Date of Patent: Jan. 11, 2011

(54) SECONDARY BATTERY AND SECONDARY BATTERY MANUFACTURING METHOD

(75) Inventors: Kinya Aota, Hitachi (JP); Kenji Nakai, Fukaya (JP); Masatsugu Arai, Kasumigaura (JP); Akinori Tada, Hitachinaka (JP)

(73) Assignee: Hitachi Vehicle Energy, Ltd., Ibaraki (JP)

( * ) Notice: Subject to any disclaimer, the term of this patent is extended or adjusted under 35 U.S.C. 154(b) by 287 days.

(21) Appl. No.: 12/018,619

(22) Filed: Jan. 23, 2008

(65) Prior Publication Data
US 2008/0182166 A1 Jul. 31, 2008

(30) Foreign Application Priority Data
Jan. 31, 2007 (JP) ............................. 2007-022141

(51) Int. Cl.
*H01M 4/00* (2006.01)
(52) U.S. Cl. .................. 429/94; 429/161; 429/211; 29/623.1; 29/623.4
(58) Field of Classification Search .............. 429/94, 429/161, 211; 29/623.1, 623.4
See application file for complete search history.

(56) References Cited

U.S. PATENT DOCUMENTS

| 6,534,212 | B1 | 3/2003 | Hooke |
| 2004/0023107 | A1 | 2/2004 | Nakanishi et al. |
| 2004/0191625 | A1 | 9/2004 | Kojima |
| 2005/0277020 | A1 | 12/2005 | Cheon |
| 2006/0204841 | A1 | 9/2006 | Satoh et al. |
| 2006/0234120 | A1 * | 10/2006 | Hamasaki et al. ........... 429/161 |

FOREIGN PATENT DOCUMENTS

| CN | 1440573 A | | 9/2003 |
| EP | 1 076 371 | | 2/2001 |
| EP | 1 484 808 A | | 12/2004 |
| JP | 60105165 A | * | 6/1985 |
| JP | 63013688 A | * | 1/1988 |

(Continued)

OTHER PUBLICATIONS

Chinese Office Action of Appln. No. 200810008538 1dated May 9, 2009.

(Continued)

*Primary Examiner*—Melvin C Mayes
*Assistant Examiner*—Melissa Stalder
(74) *Attorney, Agent, or Firm*—Antonelli, Terry, Stout & Kraus, LLP.

(57) ABSTRACT

In a secondary battery, for providing a structure which can enable a welding operation even when a gap is formed between a current collecting plate and a winding assembly, recessed portions are formed in a positive current collecting plate. The recessed portions are disposed opposite to the winding assembly. A laser beam is irradiated to welding protrusions located between the recessed portions to melt the welding protrusions. Here, since the end surface of a positive electrode foil is uneven in height, the positive electrode foil does not contact the positive current collecting plate necessarily. The welding operation is performed by heating, melting, and dropping the welding protrusions by the use of a YAG laser under the welding condition of a laser power of 900 W and a welding speed 2 m/min.

8 Claims, 5 Drawing Sheets

FOREIGN PATENT DOCUMENTS

| | | |
|---|---|---|
| JP | 2000-058038 | 2/2000 |
| JP | 2004-119330 | 4/2004 |
| JP | 2004-158394 | 6/2004 |
| JP | 2004-172038 | 6/2004 |
| JP | 2005-142026 | 6/2005 |

OTHER PUBLICATIONS

EP Search Report of Application 08001206.5 dated Jun. 5, 2009.

Office Action of Japanese Application No. 2007-022141 dated Jul. 21, 2009.

EP Search Report of Appln. No. 08 15 3469 dated Oct. 2, 2008 in English.

JP Search Report of Appln. No. 2007-153472 dated Oct. 6, 2009.

Chinese Office Action dated Dec. 25, 2009.

* cited by examiner

SECONDARY BATTERY AND SECONDARY BATTERY MANUFACTURING METHOD

FIELD OF THE INVENTION

The present invention relates to a secondary battery and a secondary battery manufacturing method, and more particularly, to a structure of a battery in which a winding assembly formed by winding a positive electrode and a negative electrode with a separator interposed therebetween is received in a battery container along with an electrolyte and in which electricity, which is charged in and discharged from the winding assembly, can be taken from positive and negative electrode terminals to an outside.

DESCRIPTION OF RELATED ART

As lithium secondary batteries used in hybrid vehicles, batteries having high power assisting ability (large current) have been required. Accordingly, in order to suppress the heat generation due to the large current, it is necessary to reduce contact resistance inside the batteries. In order to reduce the contact resistance inside the batteries, it is necessary to increase the number of welding points between a current collecting plate and a winding assembly of the batteries.

A conventional method of welding a current collecting plate and a winding assembly to each other by melting the current collecting plate which is a flat plate and dropping the melted plate with the gravity is known (see JP-A-2004-158394).

However, in the method disclosed in JP-A-2004-158394, since the current collecting plate is a flat plate, the length of the current collecting plate which is melted and dropped with the gravity is limited. In JP-A-2004-158394, it is described that the number of contact points is increased by pushing and pressing the current collecting plate against the winding assembly. However, when the electrodes or metal foils of the winding assembly are wound with a tension, and unevenness in height of one of the wound metal foils at an end side of the winding assembly is great, the metal foil is not bent even by pushing and pressing the current collecting plate against the metal foil. Accordingly, a gap is formed between the current collecting plate and the metal foil, thereby not satisfactorily increasing the number of contact points for welding.

BRIEF SUMMARY OF THE INVENTION

The invention is contrived to solve the above-mentioned problem. An object of the invention is to provide a secondary battery in which a current collecting plate is attached to a winding assembly by the use of a joint design enabling a welding work even when a great gap exists between the current collecting plate and the winding assembly and a manufacturing method of the secondary battery.

In order to accomplish the above-mentioned object, according to an aspect of the invention, there is provided a secondary battery with a structure in which a winding assembly formed by winding a positive electrode and a negative electrode with a separator interposed therebetween is received in a battery container along with an electrolyte and in which electricity which is charged in and discharged from the winding assembly can be taken from positive and negative electrode terminals to an outside, wherein a positive or negative metal foil protrudes from at least one end of the winding assembly and a current collecting plate is welded to the edge of the protruding metal foil. A plurality of recessed portions are formed in the current collecting plate before the welding and the current collecting plate is connected to the metal foil by heating and melting convex portions between the recessed portions. The welded portions of the current collecting plate after the welding form concave portions on the current collecting plate. That is, by heating the convex portions, the metal (welding metal) of the portions is melted and dropped with the gravity and can be connected to the metal foil. By solidifying the welding metal, the connection between the current collecting plate and the metal foil is ensured. The welding portions of the current collecting plate are formed on the same side of the current collecting plate so as to connect two outer peripheral edges of the winding assembly.

Further, the current collecting plate has at an outer periphery an outer peripheral bent portion which is bent toward the winding assembly. A hole is formed at a center portion of the current collecting plate by punching and an inner peripheral bent portion which is bent toward the winding assembly is formed around the hole.

According to another aspect of the invention, there is provided a manufacturing method of a secondary battery with a structure in which a winding assembly formed by winding a positive electrode and a negative electrode with a separator interposed therebetween is received in a battery container along with an electrolyte, in which electricity which is charged in and discharged from the winding assembly can be taken from positive and negative electrode terminals to an outside, and in which a current collecting plate is welded to an edge of a positive or negative metal foil protruding from at least an end side of the winding assembly. The secondary battery manufacturing method includes: preparing a current collecting plate having a plurality of recessed portions on a surface opposite to a surface in contact with the winding assembly; and welding the metal foil and the current collecting plate to each other, by heating convex portions between the recessed portions as welding portions and melting down them with the gravity.

Other features of the invention will become apparent from the following description and the accompanying drawings.

According to the invention, it is possible to obtain stable welding quality even when there is a great gap between the current collecting plate and the winding assembly.

BRIEF DESCRIPTION OF SEVERAL VIEWS OF DRAWING

DETAILED DESCRIPTION OF THE INVENTION

Figure 1:
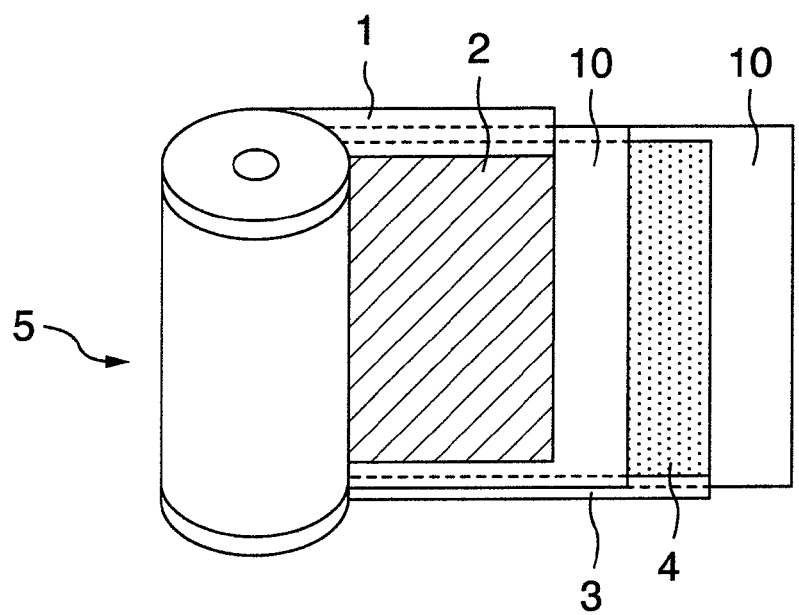
FIG. 1 is a development view illustrating a winding assembly of a secondary battery.

Hereinafter, embodiments according to the invention will be described with reference to the accompanying drawings. However, the embodiments are only examples for carrying out the invention and are not intended to limit the invention. In the drawings, the same elements are denoted by the same reference numerals.

First Embodiment

FIG. 1 is a development view illustrating a known winding assembly. In FIG. 1, a winding assembly 5 is formed by winding plural members. In the winding assembly 5, one member is a positive electrode foil 1 (for example, an aluminum foil with a thickness of 10 μm) of which both surfaces are coated with a positive electrode material 2 and another member is a negative electrode foil 3 (for example, a copper foil) of which both surfaces are coated with a negative electrode material 4. The foils are wound with a separator 10 interposed therebetween to form the winding assembly 5. The winding assembly 5 is put into an electrolyte to serves as a secondary battery of being charged and discharged.

Figure 2:
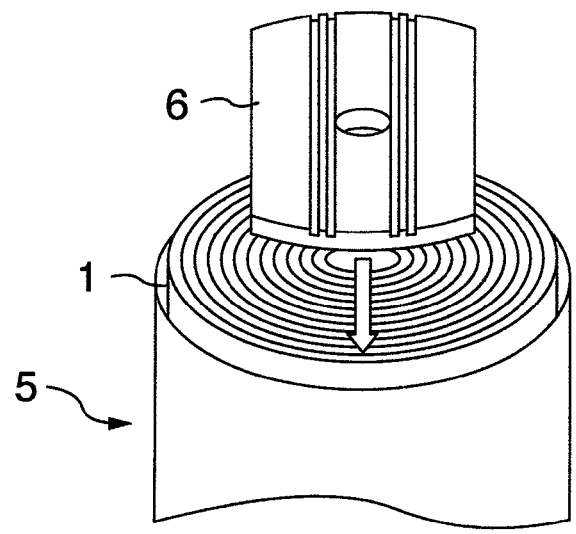
FIG. 2 is a perspective view illustrating a current collecting plate and a winding assembly of a secondary battery according to a first embodiment of the invention.

FIG. 2 is a perspective view illustrating a state of the embodiment according to the invention before a current collecting plate 6 is attached to the winding assembly 5. The positive electrode foil 1 protrudes from the end side of the winding assembly 5 in a wound state. In order to serve as a secondary battery, it is necessary to connect (weld) the positive current collecting plate 6 to the positive electrode foil 1 to transmit the electricity charged in and discharged from the winding assembly 5.

Figure 3:
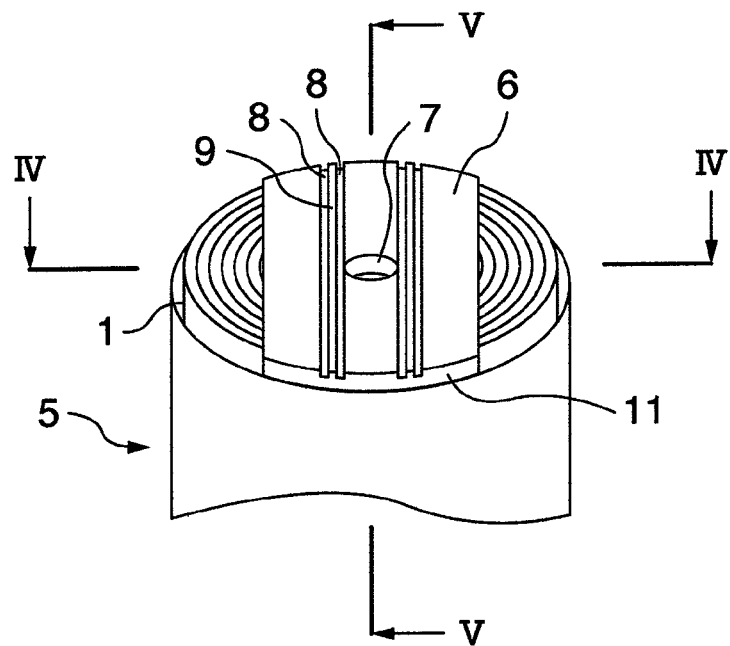
FIG. 3 is a perspective view illustrating the current collecting plate and the winding assembly of the secondary battery according to the first embodiment of the invention before they are welded to each other.
Figure 4:
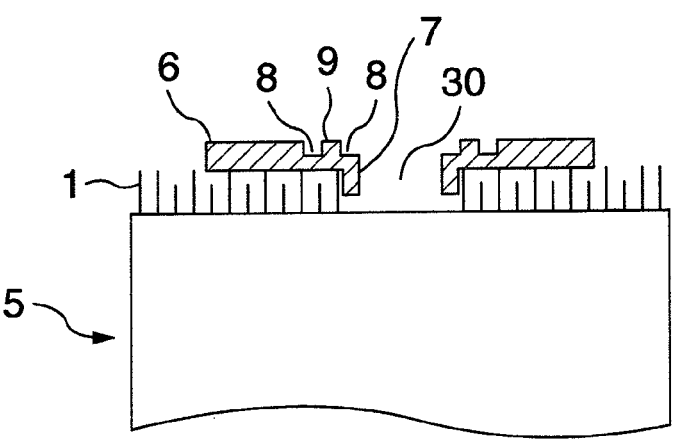
FIG. 4 is a cross-sectional view taken along line IV-IV in FIG. 3.

FIG. 3 is a perspective view illustrating a state of the embodiment where the current collecting plate 6 is placed on the winding assembly 5 before they are welded to each other. FIG. 4 is a cross-sectional view taken along line IV-IV in FIG. 3. The current collecting plate 6 according to this embodiment has a shape obtained by cutting off both end sides of a disc and includes two welding protrusions (convex lines) 9 and four recessed portions (concave lines) 8 parallel to the line V-V (perpendicular to line IV-IV) on both sides of a center hole 30 of the current collecting plate. The disposed positive current collecting plate 6 is formed of an aluminum plate with a thickness of 1 mm and the recessed portions 8 are formed by a mechanical machining operation with, for example, a width of 1 mm and a depth of 0.5 mm. As shown in FIG. 4, the recessed portions 8 formed in the positive current collecting plate 6 are disposed in the surface opposite to the surface contacting the winding assembly 5. Then, by applying a laser beam to the welding protrusions 9 located between two recessed portions 8, the current collecting plate 6 is welded to the positive electrode foil 1. For example, the welding is performed by the use of a YAG laser under the welding condition of a laser power of 900 W and a welding speed of 2 m/min.

At this time, since the end face of the positive electrode foil 1 is not even in height, the entire end of the positive electrode foil 1 comes in contact with the positive current collecting plate 6. If a laser beam is irradiated from the top surface of the flat current collecting plate without the recessed portions 8, the melted metal does not droop sufficiently due to the surface tension of the melted metal (welding metal), and thus a portion of the positive electrode foil 1 may remain without contacting the welding metal. However, in this embodiment, since the recessed portions 8 are disposed on both sides of the welding protrusions 9, it is possible to reduce the influence of the surface tension acting on the welding metal at the time of the application of the laser beam and the melted metal droops down enough to come in contact with the winding assembly 5 (see FIG. 7).

Figure 5:
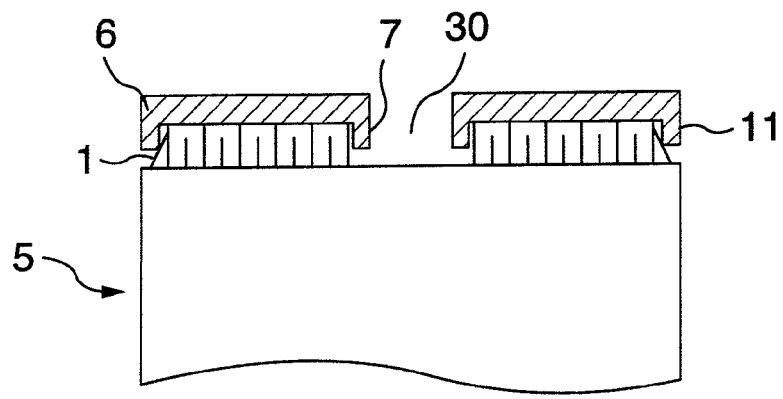
FIG. 5 is a cross-sectional view taken along line V-V in FIG. 3.

FIG. 5 is a cross-sectional view taken along line V-V of FIG. 3. As shown in FIG. 5, the positive current collecting plate 6 includes an inner peripheral bent portion 7 and an outer peripheral bent portion 11 which are formed by bending a flat plate toward the winding assembly 5. These bent portions are provided to prevent welding deformation. That is, if the positive current collecting plate 6 is a simple flat plate, an angular deformation or a warp deformation may be caused by the welding. However, when the portions are bent at 90° with respect to the positive current collecting plate 6 by means of the above bending process, strength enough to endure the deformation at the time of welding the current collecting plate 6 is provided, thereby realizing a welding process without any welding deformation. The inner peripheral bent portion 7 is formed by extruding a flat plate which would be a current collecting plate, punching the center thereof, and then pressing the resultant structure. The outer peripheral bent portion 11 is also formed by pressing the outer periphery of the extruded structure. It is preferable to extrude and shape the current collecting plate 6 that the current collecting plate 6 is symmetric.

Figure 6:
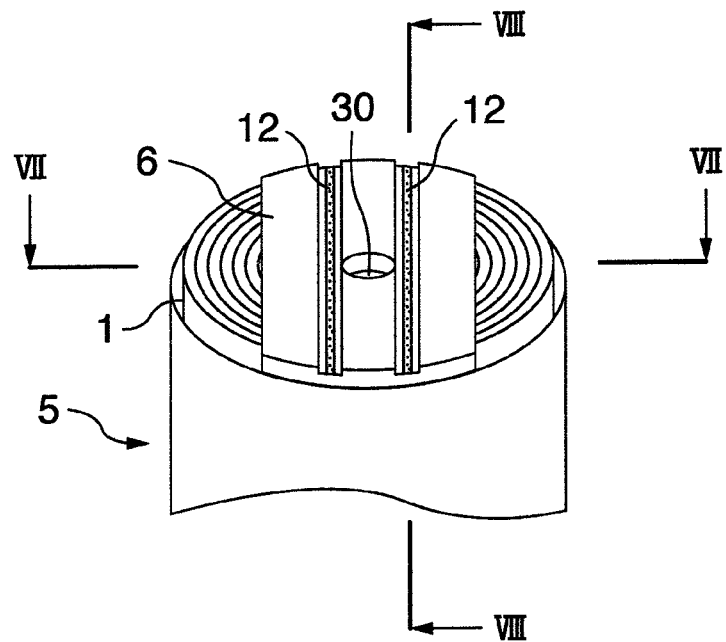
FIG. 6 is a perspective view illustrating the current collecting plate and the winding assembly of the secondary battery according to the first embodiment of the invention after they are welded to each other.

FIG. 6 is a perspective view illustrating a welded state. As shown in FIG. 6, the positive current collecting plate 6 is welded at positions of two welding metals 12 (positions corresponding to the welding protrusions 9). In the first embodiment, since the number of contact points between the positive current collecting plate 6 and the winding assembly 5 can be sufficiently secured from two welding positions, it is not necessary to enlarge the size of the current collecting plate 6. Accordingly, it is possible to reduce the size of the current collecting plate 6 and thus to reduce the cost for the components and materials. According to this embodiment, since the welding operation is performed along the welding positions on the same side, it is possible to reduce the number of welding operations. Therefore, it is not necessary to rotate the secondary battery during the welding operation. As a result, it is possible to simplify the welding equipment.

Figure 7:
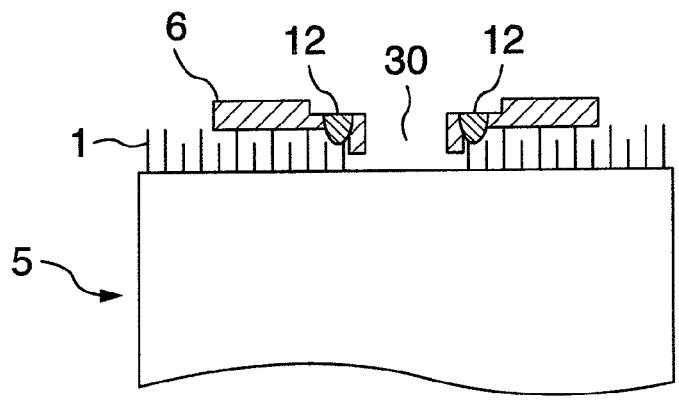
FIG. 7 is a cross-sectional view taken along line VII-VII in FIG. 6.

FIG. 7 is a cross-sectional view taken along line VII-VII of FIG. 6. As shown in FIG. 7, a laser beam is applied to the welding protrusions 9 to melt metal of the corresponding portions and the welding metal 12 is dropped with the gravity. As described above, since the influence of the surface tension on the welding metal 12 is reduced according to the function of the recessed portions 8, the welding metal 12 is sufficiently melted and dropped and the positive electrode foil 1 and the positive current collecting plate 6 are accordingly welded to each other. That is, the unevenness in height of the end face of the positive electrode foil 1 is about 0.5 mm and thus the entire end face does no come in contact with the positive current collecting plate 6. In this condition, according to this embodiment, the height by which the welding metal is melted and dropped can be made more than 0.5 mm. Accordingly, the positive electrode foil 1 and the positive current collecting plate 6 can be welded to each other, even when a certain gap exists between the positive electrode foil 1 and the positive current collecting plate 6. In this embodiment, further, since the positive current collecting plate 6 is welded to the positive electrode foil 1 by melting and dropping, the welding operation can be performed in the state where the positive electrode foil 1 is wound, and the positive electrode foil 1 and the positive current collecting plate 6 can be welded to each other substantially at a right angle.

Figure 8:
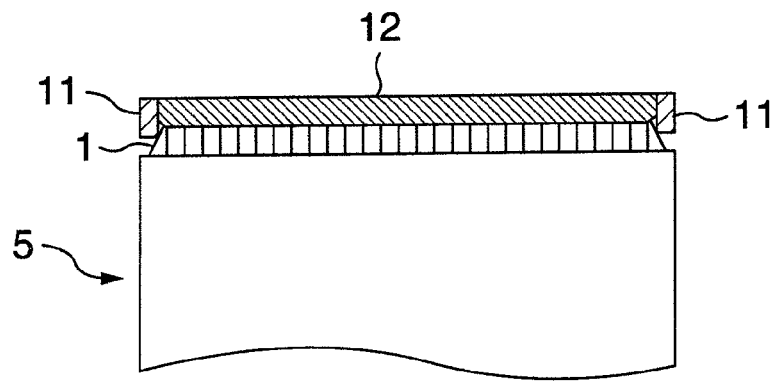
FIG. 8 is a cross-sectional view taken along line VIII-VIII in FIG. 6.

FIG. 8 is a cross-sectional view taken along line VIII-VIII of FIG. 6 and shows a section of the center portion of the welding metal 12. For example, when the positive electrode foil 1 is wound in 12 turns, the welding operation of one welding metal can weld at 24 positions by selecting the welding positions to connect the outer peripheral ends of the winding assembly 5. When the number of welding positions increases, the number of contact positions between the current collecting plate 6 and the positive electrode foil 1 can increase, thereby reducing the contact resistance between the positive electrode foil 1 and the positive current collecting plate 6. This is advantageous particularly for a secondary battery with large current as described above. According to this embodiment, as described above, since 24 contact positions can be secured by the welding operation of one welding metal, it is not necessary to perform a welding operation in a wide range so as to increase the number of contact positions unlike the simple flat current collecting plate (JP-A-2004-158394), and it is possible to simply perform the welding operation for a short time.

Figure 9:
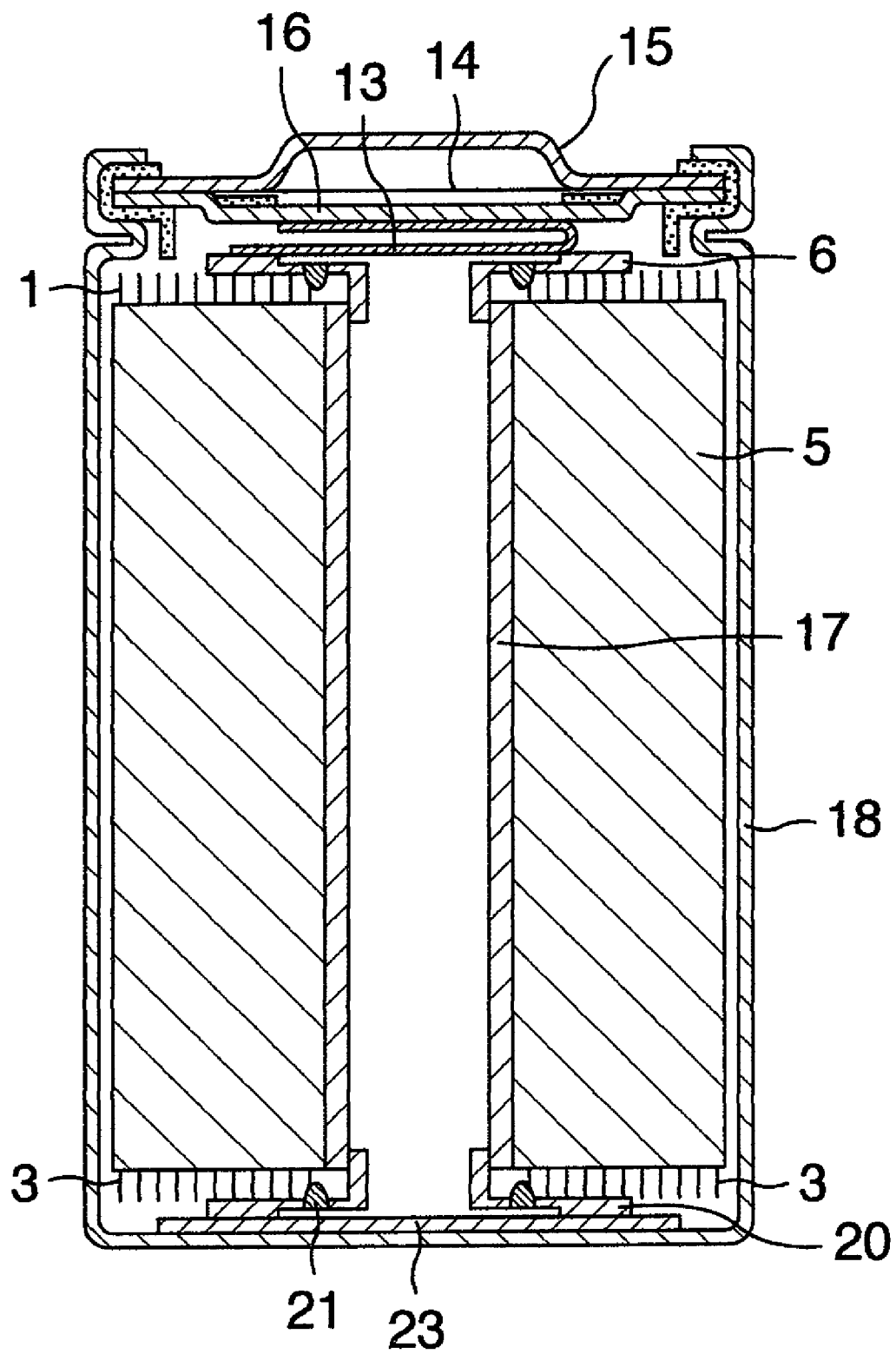
FIG. 9 is a cross-sectional view illustrating an entire configuration of a secondary battery.

FIG. 9 is a cross-sectional view illustrating the entire structure of a battery. In FIG. 9, the winding assembly 5 in which the positive electrode foil 1 coated with the positive electrode material 2 and the negative electrode foil 3 coated with the negative electrode material 4 are wound with the separator 10 interposed therebetween is disposed around a core 17 in a cell can 18, and the positive electrode foil 1 and the negative electrode foil 3 are exposed on the respective end sides of the winding assembly 5. The positive electrode foil 1 and the positive current collecting plate 6 are welded to each other by the method shown in FIGS. 2 to 8, and the positive electrode foil is electrically connected to an upper lid cap 15 through a path formed by the positive current collecting plate 6, a lead 13, and an upper lid connecting plate 16. That is, it is electrically connected to the outside. On the other hand, the negative electrode foil 3 is electrically connected to the cell can 18 through a negative current collecting plate 20 and a negative electrode connecting plate 23. An electrolyte along with the elements is injected into the cell can 18 and the electricity is charged in and discharged from the winding assembly 5. The invention relates to the structures of connecting the positive electrode foil 1 to the positive current collecting plate 6 and connecting the negative electrode foil 3 to the negative current collecting plate 20. The negative electrode party has the same structure as the positive electrode party but is different therefrom in material. The negative electrode foil 3 is formed of a copper foil with a thickness of 10 μm and the negative current collecting plate 20 is formed of a copper plate. The negative electrode foil 3 and the negative current collecting plate 20 are welded to each other by the use of the welding metal 21.

Second Embodiment

Figure 10:
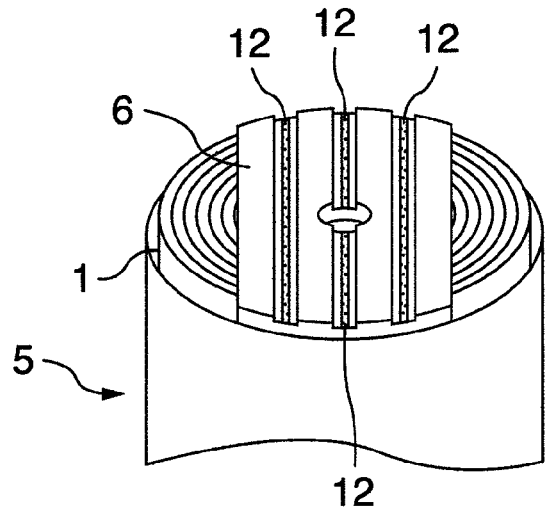
FIG. 10 is a perspective view illustrating a current collecting plate and a winding assembly of a secondary battery according to a second embodiment of the invention after they are welded to each other.

FIG. 10 is a perspective view illustrating a secondary battery according to a second embodiment of the invention after the welding operation is performed. The secondary battery according to the second embodiment is equal to the secondary battery according to the first embodiment, except that four welding metals 12 are used, and thus description thereof will be omitted.

It is possible to obtain the same advantages as the first embodiment from a joint design according to the second embodiment.

Third Embodiment

Figure 11:
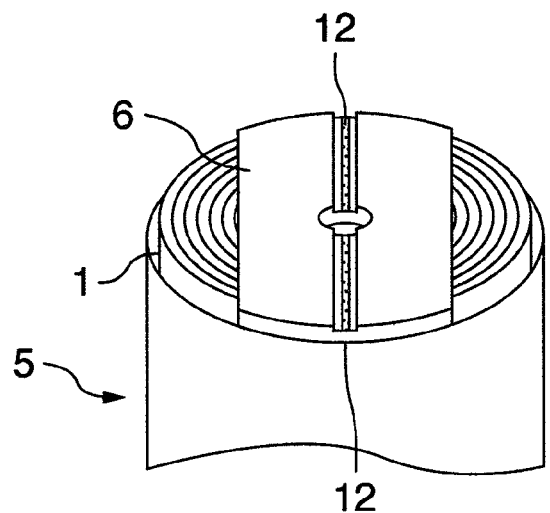
FIG. 11 is a perspective view illustrating a current collecting plate and a winding assembly of a secondary battery according to a third embodiment of the invention after they are welded to each other.

FIG. 11 is a perspective view illustrating a secondary battery according to a third embodiment of the invention after the welding operation is performed. The secondary battery according to the third embodiment is equal to the secondary battery according to the first embodiment, except that two welding metals 12 are used, and thus description thereof will be omitted. Since the number of welding positions is smaller than those of the secondary batteries according to the first and second embodiments, the contact resistance cannot be lower than those of the first and second embodiments, but there is no problem in actual use.

It is possible to obtain the same advantages as the first embodiment from a joint design according to the third embodiment.

Fourth Embodiment

Figure 12:
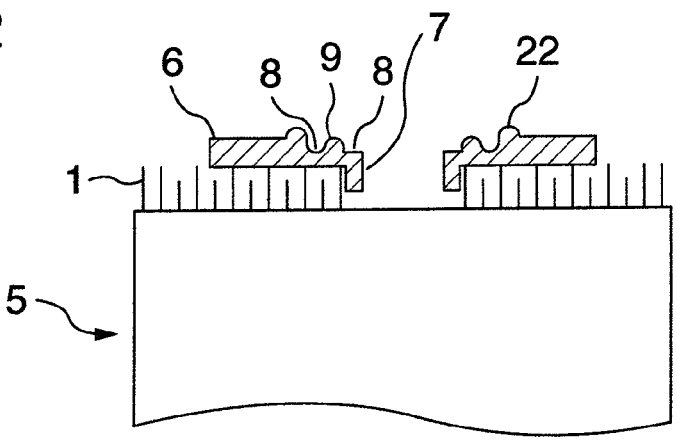
FIG. 12 is a perspective view illustrating a current collecting plate and a winding assembly of a secondary battery according to a fourth embodiment of the invention before they are welded to each other.

FIG. 12 is a cross-sectional view (corresponding to the cross-sectional view of FIG. 4) illustrating a secondary battery according to a fourth embodiment of the invention before the welding operation is performed. In the fourth embodiment, the positive current collecting plate 6 is made by a cold forging process (pressing process). Accordingly, the recessed portions 8 are formed in a circular-arc shape section and a weld reinforcement 22 may be formed outside them. The pressing process has an advantage that it is lower in cost than the machining process according to the first embodiment.

It is possible to obtain the same advantages as the first embodiment from a joint design according to the fourth embodiment.

As described above, the embodiments provide a secondary battery with a structure in which a winding assembly formed by winding a positive electrode and a negative electrode with a separator interposed therebetween is received in a battery container along with an electrolyte and in which electricity which is charged in and discharged from the winding assembly can be taken from positive and negative electrode terminals to the outside, wherein a positive or negative metal foil protrudes from at least one end of the winding assembly and a current collecting plate is welded to the edge of the protruding metal foil. A plurality of recessed portions are formed on the surface of the pre-welded current collecting plate opposite to the surface in contact with the winding assembly, and the current collecting plate is connected to the metal foil by melting and dropping convex portions between the recessed portions. In this way, it is possible to perform the welding operation even when a gap exists between the current collecting plate and the winding assembly. Since the thickness of the current collecting plate other than the welding portions can increase by providing the recessed portions, it is possible to reduce the welding deformation. The current collecting plate can be formed of an extruded material.

Since the welding portions of the current collecting plate are formed to connect two outer peripheral edges of the winding assembly on the same surface of the current collecting plate, it is possible to reduce the number of welding operations and to reduce the welding range on the current collecting plate. Accordingly, since it is not necessary to change the direction of the secondary battery during the welding operation, it is possible to simplify the welding process. Since the welding range can be reduced, it is possible to reduce the size of the current collecting plate and thus to reduce the cost for the components. Further, since the metal can be made to sufficiently droop down by heating the metal, it is possible to increase the number of connection points to the metal foil and thus to reduce the contact resistance between the current collecting plate and the metal foil.

The current collecting plate has at the outer periphery an outer peripheral bent portion which is bent toward the winding assembly. A hole is formed at the center portion of the current collecting plate by punching process, and an inner peripheral bent portion which is bent toward the winding assembly is formed around the hole. By providing such bent portions, it is possible to enhance the strength of the current collecting plate, thereby preventing the deformation of the current collecting plate due to the welding and thus performing the welding operation with high precision. As a result, it is possible to provide a secondary battery having positive and negative electrodes with stable shapes.

In addition, the embodiments provide a secondary battery manufacturing method, that is, a manufacturing method of a secondary battery with a structure in which a winding assembly formed by winding a positive electrode and a negative electrode with a separator interposed therebetween is received in a battery container along with an electrolyte, in which electricity which is charged in and discharged from the winding assembly can be taken from positive and negative electrode terminals to the outside, and in which a current collecting plate is welded to an edge of a positive or negative metal foil protruding from at least an end of the winding assembly. The secondary battery manufacturing method includes: preparing a current collecting plate having a plurality of recessed portions on the surface opposite to the surface in contact with the winding assembly; and welding the metal foil and the current collecting plate to each other, by heating and melting convex portions as welding portions between the recessed portions and by dropping them with the gravity. Accordingly, since the bad influence of the surface tension on the welding metal can be removed, the metal can be made to sufficiently droop down by heating the metal, thereby increasing the number of connection points to the metal foil. As a result, it is possible to reduce the contact resistance between the current collecting plate and the metal foil.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A secondary battery with a structure in which a wound assembly formed by winding a positive electrode and a negative electrode with a separator interposed therebetween is received in a battery container along with an electrolyte and in which electricity which is charged in and discharged from the wound assembly can be taken from positive and negative electrode terminals to an outside, wherein a positive or negative metal foil protrudes from at least an end of the wound assembly and a current collecting plate is welded to the edge of the protruding metal foil, and wherein said current collecting plate is provided, before a welding operation, with recessed portions on a surface at a side opposite to a side facing said wound assembly, convex portions between said recessed portions on the surface at the side opposite to a side facing said wound assembly, and a flat surface at the side facing said wound assembly; and, by welding, is provided with welded portions which are formed from said convex portions being melted by heating said convex portions from the side of said current collecting plate opposite to the side facing said wound assembly so as to weld the melted portions to the edge of said protruding metal foil.

2. The secondary battery according to claim 1, wherein the welding portions of the current collecting plate are formed on the same surface of the current collecting plate.

3. The secondary battery according to claim 1, wherein the welding portions of the current collecting plate are formed to connect two outer peripheral ends of the winding assembly.

4. The secondary battery according to claim 1, wherein the current collecting plate has at the outer periphery an outer peripheral bent portion which is bent toward the winding assembly.

5. The secondary battery according to claim 1, wherein a hole is formed at a center portion of the current collecting plate by punching and an inner peripheral bent portion which is bent toward the winding assembly is formed around the hole.

6. A manufacturing method of a secondary battery with a structure in which a wound assembly formed by winding a positive electrode and a negative electrode with a separator interposed therebetween is received in a battery container along with an electrolyte, in which electricity which is charged in and discharged from the wound assembly can be taken from positive and negative electrode terminals to an outside, and in which a current collecting plate is welded to an edge of a positive or negative metal foil protruding from at least an end of the wound assembly, said secondary battery manufacturing method comprising the steps of:

preparing a current collecting plate having a plurality of recessed portions on the surface opposite to the surface in contact with the winding-wound assembly, convex portions between said recessed portions on the surface at the side opposite to a side facing said wound assembly, and a flat surface at the side facing said wound assembly; and welding the metal foil and the current collecting plate to each other, by heating and melting the convex portions as welding portions between the recessed portions from the side of said current collecting plate opposite to the side facing said wound assembly and dropping them gravity.

7. The manufacturing method of the secondary battery according to claim 6, wherein the plurality of recessed portions of the current collecting plate are disposed on the same side and the heated surface is the same side.

8. The manufacturing method of the secondary battery according to claim 6, wherein the step of preparing the current collecting plate includes the steps of:

forming a bent portion for preventing a deformation of the current collecting plate due to the welding operation, by bending toward the winding assembly at least one of an outer peripheral portion of a symmetric flat plate having a hole at a center portion thereof and an inner peripheral portion forming the hole; and forming the plurality of recessed portions in the flat plate by a machining process or a pressing process.

* * * * *